(12) United States Patent
Sharma et al.

(10) Patent No.: US 9,179,080 B2
(45) Date of Patent: Nov. 3, 2015

(54) SYSTEM AND METHOD TO CAPTURE IMAGES WITH REDUCED BLURRINESS IN LOW LIGHT CONDITIONS

(71) Applicant: QUALCOMM Incorporated, San Diego, CA (US)

(72) Inventors: Piyush Sharma, San Diego, CA (US); Chao Jia, Austin, TX (US); Ramin Rezaiifar, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 14/252,560

(22) Filed: Apr. 14, 2014

(65) Prior Publication Data
US 2015/0195464 A1    Jul. 9, 2015

Related U.S. Application Data

(60) Provisional application No. 61/924,065, filed on Jan. 6, 2014.

(51) Int. Cl.
*H04N 5/353* (2011.01)
*H04N 5/235* (2006.01)

(52) U.S. Cl.
CPC .......... *H04N 5/3537* (2013.01); *H04N 5/2355* (2013.01)

(58) Field of Classification Search
CPC .............................. H04N 5/353; H04N 5/2353
USPC ................................... 348/362–366, 296, 297
See application file for complete search history.

(56) References Cited

U.S. PATENT DOCUMENTS

| 7,317,843 | B2 | 1/2008 | Sun et al. |
| 7,463,296 | B2 | 12/2008 | Sun et al. |
| 8,199,222 | B2 | 6/2012 | Drimbarean et al. |
| 2009/0179999 | A1 | 7/2009 | Albu et al. |
| 2010/0265357 | A1* | 10/2010 | Liu et al. .................... 348/223.1 |
| 2012/0114264 | A1 | 5/2012 | Shmunk et al. |
| 2014/0347552 | A1* | 11/2014 | Levoy et al. .................. 348/362 |

\* cited by examiner

*Primary Examiner* — Tuan Ho
(74) *Attorney, Agent, or Firm* — Knobbe Martens Olson & Bear LLP (57) ABSTRACT

Methods, devices, and computer program products for capturing images with reduced blurriness in low light conditions are contained herein. In one aspect, a method of capturing an image is disclosed. The method includes capturing a plurality of first images with a first exposure length. The method further includes aligning each of the plurality of first images with each other and combining the aligned plurality of first images into a combined first image. The method further includes capturing a second image with a second exposure length, wherein the second exposure length is longer than the first exposure length and using the second image to adjust the brightness of the combined first image.

20 Claims, 4 Drawing Sheets

SYSTEM AND METHOD TO CAPTURE IMAGES WITH REDUCED BLURRINESS IN LOW LIGHT CONDITIONS

RELATED APPLICATIONS

The present application for patent claims the benefit of U.S. Provisional Application No. 61/924,065, entitled "SYSTEM AND METHOD TO CAPTURE IMAGES WITH REDUCED BLURRINESS IN LOW LIGHT CONDITIONS," filed Jan. 6, 2014, and assigned to the assignee hereof, and hereby expressly incorporated by reference herein.

FIELD

The present application relates generally to digital imaging, and more specifically to systems, methods, and devices for capturing images with reduced blurriness in low light conditions.

BACKGROUND

Image capture devices with small physical pixels, such as those in cell phone cameras, are widely used. However, these devices may have difficulty capturing high-quality images in low-light scenarios. For example, one approach to capturing an image in a low-light scenario is to use a long exposure time. However, a long-exposure image may become blurred if the image capture device, such as a handheld phone camera, is in motion. Others have approached this problem by blindly de-blurring a blurred long-exposure image, which requires estimating camera motion and deconvolving the image using the estimated motion. This approach may be computationally difficult, and may also be unsuccessful in creating high-quality images.

Another option is to use a short exposure time, which may reduce blurriness. However, in a low-light scenario, a short exposure time may result in a dark image. In order to brighten this image, the camera sensor gain (ISO) may be increased. However, increasing the ISO of the image in a dark image may result in a noisy image. Another approach to brighten a short-exposure image may be to use flash. However, the flash does not usually help in outdoor scenarios, and flash may also lead to artificial color offsets and decrease the color accuracy in the resulting image.

Accordingly, no camera exposure setting can result in a sharp, bright and noise-free image from a moving camera in a relatively dark scenario.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include robust estimation of color-dependent measurements.

In one aspect, a method of capturing an image is claimed. The method includes capturing a plurality of first images frames with a first exposure length using an image sensor and storing the plurality of first frames on a memory component, processing the captured plurality of first frames to aligning each of the plurality of first images frames with each other, and combining the aligned plurality of first images frames into a combined first image. The method further includes capturing a second image with a the second exposure length using an image sensor and storing the second image on the memory component, wherein the second exposure length is longer than the first exposure length, and using the second image to adjust the brightness of the combined first image.

In some aspects, using the second image may include determining a histogram of the colors in the combined first image and a histogram of the colors in the second image and calculating a mapping of the colors from the combined first image to the colors of the second image based at least in part on the histogram of the colors in the combined first image and the histogram of the colors in the second image. In some aspects processing the captured plurality of first frames includes using an affine fit process. In some aspects, the affine fit process is a six-parameter affine fit. Combining the aligned plurality of first frames may include using pixel averaging to combine the aligned plurality of first frames. Combining the aligned plurality of first frames into a combined first image may include converting the aligned plurality of first frames into YUV format and combining the aligned plurality of first frames in each of a Y channel, a U channel, and a V channel. In some aspects, combining the aligned plurality of first frames in the Y channel includes using a denoising process and an optimization process to combine the frames in the Y channel. In some aspects, the denoising process is based on a L1-norm Total Variation model. In some aspects, the optimization process comprises using of a Split-Bregman algorithm, a limited-memory Broyden-Fletcher-Goldfarb-Shanno algorithm, or an iteratively reweighted least squares algorithm.

In one aspect, a device for capturing an image is disclosed. The device includes an image sensor configured to capture a plurality of first frames with a first exposure length and store the plurality of first frames on a memory component, and a processor configured to process the captured plurality of first frames to align each of the plurality of first frames with each other, combine the aligned plurality of first frames into a combined first image, capture a second image with a second exposure length using the image sensor and storing the second image on the memory component, wherein the second exposure length is longer than the first exposure length, and use the second image to adjust the brightness of the combined first image.

In one aspect, a device for capturing an image is disclosed. The device includes means for capturing a plurality of first frames with a first exposure length using an image sensor and storing the plurality of first frames on a memory component, means for processing the captured plurality of first frames to align each of the plurality of first frames with each other, means for combining the aligned plurality of first frames into a combined first image, means for capturing a second image with the second exposure length using an image sensor and storing the second image on the memory component, wherein the second exposure length is longer than the first exposure length, and means for using the second image to adjust the brightness of the combined first image.

DETAILED DESCRIPTION

Figure 1:
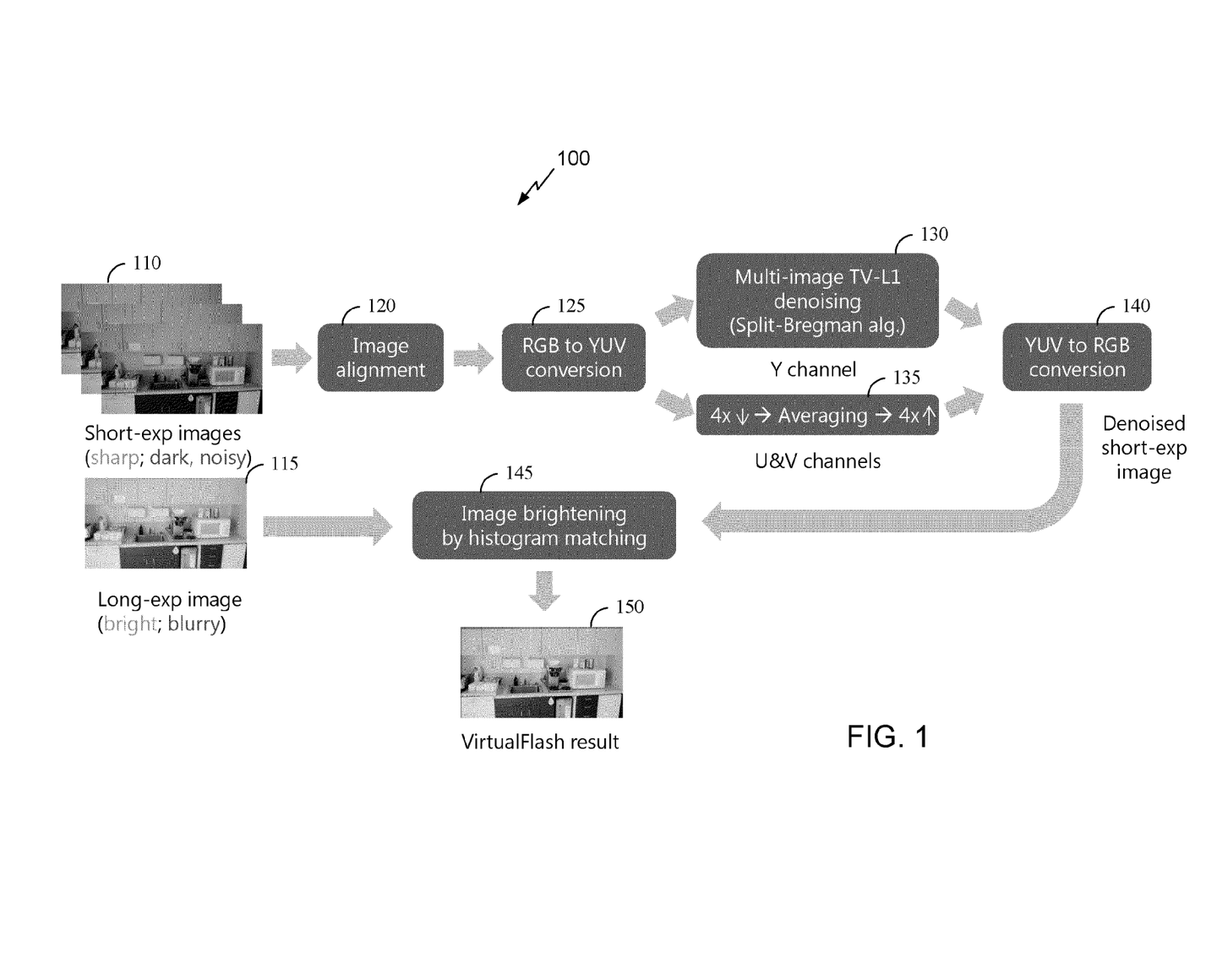
FIG. 1 is an illustration of a method for capturing images with reduced blurriness in low-light conditions.

FIG. 1 is an illustration 100 of a method for capturing images with reduced blurriness in low-light conditions. In one embodiment, one or multiple short-exposure images 110 with optionally high-ISO settings may be captured on an image capture device in a low-light setting. The one or multiple short-exposure images 110 may be sharp but noisy, due to the short exposure length used. For example, the ISO setting for these short-exposure images 110 may be less than an automatic ISO setting, for the given light conditions. In addition, a long-exposure image 115 may be captured, such as an image with an automatic ISO setting. This long-exposure image 115 may be blurry due to camera motion, but may result in a bright, colorful, noise-free image.

In the situation where multiple short-exposure images 110 are captured, those images may be averaged to give a relatively less noisy image. For example, first, each of the short-exposure images 110 may be aligned with each other. For example, an image alignment 120 algorithm may be used, which identifies certain portions of each captured image, and aligns the images together based on the identified portions in each of the captured images. The aligned images may then be converted 125 from RGB to the YUV color space. This conversion may be useful, as it may allow for more efficient ways of combining the images together.

If these aligned images were simply averaged, the resulting image would be less noisy than the individual short-exposure images 110, but may still have a noise level that is too high to be acceptable. To reduce this noise level, the combined image may be denoised using a regularization model (e.g., L1-norm Total Variation), and optimization techniques (e.g., Split-Bregman, LBFGS) which results in a sharp, noise-free, but dark image. This denoising can be done on the RGB channels, or on Y channel alone. In case of denoising only the Y channel, the U and V channels may be simply averaged. For example, the luma (Y) channel may be denoised using multi-image TV-L1 denoising 130, while the chroma (U and V) channels may be simply averaged 135. In some aspects, the chroma channels can be scaled to a smaller size prior to averaging. For example, each 4×4 block of the U and V channels of the image may be averaged into a single pixel, This size reduction may be done to any size, for example, a 2×2 block, a 3×3 block, a 5×5 block, or any other size of block (square or not) may be averaged into a single pixel. Averaging multiple pixels into a single pixel in this way may reduce run-time of the averaging operation and may also reduce noise. This averaging on the U and V channels may, thus, be done both spatially, by averaging adjacent pixels in an image together as above, as well as be done across images, by averaging pixels from two or more images together. While this does lead to a loss of resolution in chroma (U and V channels), this loss of resolution may not be as observable to a human user as the resolution in luma (Y) channel. After performing these operations, the image may be converted back from YUV format to RGB format 140. The resulting image obtained from these short-exposure frames may be sharp and noise-free, but still dark.

The long-exposure image 115 may then be used to brighten up 145 the image from the short-exposure frame or frames, using the known color statistics of the scene as captured in the long-exposure image 115. This can be done using a simple color transfer (e.g., in U and V channels), or more complex schemes like histogram-matching (e.g. in RGB channels). Using the long-exposure frame to brighten up the image created using the short-exposure frames 110 may result in a final image 150 which is sharp, noise-free and which is bright. In some aspects, one could also brighten-up the short exposure image by doing histogram-matching in the luma (Y) channel only, and boosting the chroma (U and V channels) values for a given pixel using a constant factor, or a factor dependent on the intensity in the neighborhood of that pixel.

One advantage of the process outlined above and illustrated in FIG. 1 is that the process doesn't require estimation of the motion of the camera, such as using inertial sensors, or deconvolution. Deconvolution can often result in artifacts in captured images, while both deconvolution and motion estimation may be computationally expensive, and therefore difficult to implement on a mobile device. Accordingly, the fast, robust approach outlined above may be advantageous.

Figure 2:
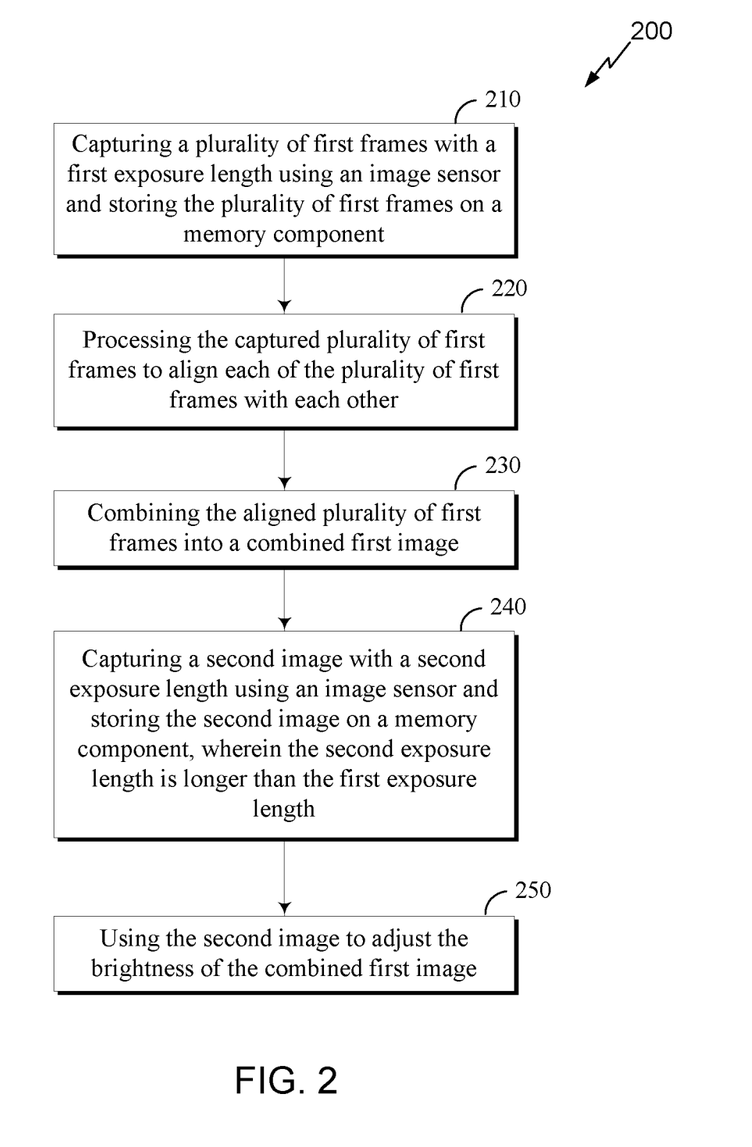
FIG. 2 illustrates an exemplary method of capturing an image using virtual flash.

FIG. 2 illustrates an exemplary method 200 of capturing an image using virtual flash. This method 200 may be used by an image capture device, such as a cell phone, a tablet, a digital camera, or another wireless device.

At block 210, the method includes capturing a plurality of first frames with a first exposure length using an image sensor and storing the plurality of first frames on a memory component. For example, the plurality of first frames may be captured using an image sensor found in a cell phone or other wireless device. These first frames may be captured in relatively dark lighting conditions, such as at night or in poor indoor lighting. In some aspects, the first exposure length may be a relatively short exposure length. For example, this exposure length may be chosen by a processor or an image sensor, and may minimize motion blur in a frame because of the relatively short length of the exposure. However, because the scene may be relatively dark, each of the frames of the plurality of first frames may be darker than the actual scene. Accordingly, each of the first frames may be clear, but may be darker than a desired final image. In some aspects, the means for capturing the plurality of first frames may include an image sensor.

At block 220, the method includes processing the captured plurality of first frames to align each of the plurality of first frames with each other. Generally, when a series of images are captured using a hand-held camera, the camera may jitter and pan slightly between the times when different frames are captured. In some aspects, a number of different methods to align the plurality of first frames may be used. For example, a pair of images may be aligned with each other by detecting and matching feature points within the images, such as normalized cross-correlation matching. From these match points, a global homography (or affine) transformation may be found, which would align the matched feature points in one image to those same points in the other image. Based on this homography, one image may be warped to match the other image. For example, the warping of the images may use an affine fit, such as a six-parameter affine fit, may be used to align each of the plurality of first frames with each other. For example, this alignment may include an affine registration that is an approximation to an actual 8-parameter projective transform, which accounts for the physical mapping of a point in 3D space onto the image plane. However, rather than using eight parameters, six may be used in order to simplify the calculations needed. Using a reduced number of parameters in this way may still be accurate for small viewpoint changes, such as those which may be causes by hand jitter or panning as the camera captures images at a high frame rate. These affine parameters include a rotation angle in the plane of the image, two orthogonal translation coordinates, two scaling parameters to account for anisotropic scaling, and a shearing parameter that accounts for axis tilt. Aligning the frames prior to combining the frames may reduce blurriness in the resulting image, and accordingly, may improve image quality. In some aspects, the means for processing may include a processor.

At block 230, the method includes combining the aligned plurality of first frames into a combined first image. For example, after the first frames are aligned with each other, these frames may be combined together. This combination may be a pixel-by-pixel averaging of each of the first frames. In some aspects, a weighted average may be used between the frames, where the weight may be determined based upon a number of factors, such as a focus quality of the frames, a temporal proximity to the center time of the number of frames. In some aspects, only a subset of the plurality of first frames may be used in this combination. For example, if one or more of the first frames are found, such as during the aligning, to be out of focus, to contain too much noise, or a frame does not lend itself to accurate alignment with the other frames, or for other reasons, one or more of the frames may be discarded. In some aspects, the means for combining may include a processor.

In some aspects, combining the aligned plurality of first frames may include converting each of the frames to the YUV color space prior to combination. For example, this may be beneficial as different methods to combine the frames could be used on the Y (luma) channel as on the U and V (chroma) channels. For example, in the luma channel, the image may be denoised by using a regularization model, such as an L1-norm Total Variation model, and optimization techniques may be used to combine the images according to the formula:

$$\min_I \sum_{i=1}^{N} \|J_i - I\|_2 + \lambda \|\nabla I\|_1$$

Where I is the denoised image, $J_i$ is the noisy short-exposure images, and $\nabla I$ is the image gradient. This formula seeks to minimize the difference (sum of square differentials) of the image I, from each of the short-exposure images $J_i$. The second term of this formula is a measure of the image derivative. Noise in an image will typically make this gradient higher. Accordingly, the minimization operation above tries to estimate an image I which is as close as possible to the noisy images, but has a much smaller gradient (for example, less noise). A trivial solution to this problem could be to average each of the input noisy images. This will minimize the first term, but will lead to a large second term in the equation. Another trivial solution would be a low-pass-filtered version of the input image. This reduces the second term, but will increase the first term. Thus, the ideal solution to the above equation is an image which is as close as possible to the input images, but at the same time has as low noise as possible. In this equation, λ is the weight given to the second term relative to the first term. For example, λ may be 0.2.

There are a number of possible solutions to this problem to come up with the coefficient λ. For example, the Split-Bregman algorithm may be used, or the Limited-memory Broyden-Fletcher-Goldfarb-Shanno (LBFGS) algorithm, or the iteratively reweighted least squares (IRLS) algorithm. Each of these may be used, or other algorithms may be used, in order to combine the images in the Y (luma) channel. In some aspects, the above techniques may also be used in the R,G,B channels without converting the image to YUV. In the U and V (chroma) channels, simpler and less complex algorithms may be used. For example, these channels may be simply averaged, as human perception may be less affected by image quality in the U and V channels than in the Y channel.

At block 240, the method includes capturing a second image with a second exposure length using an image sensor and storing the second image on a memory component, wherein the second exposure length is longer than the first exposure length. For example, in some aspects, the second exposure length may be chosen to be a length that will allow the second image to be of a desired brightness. For example, the second exposure length may represent a longer exposure length which allows a bright image even in dark conditions, but which may suffer from blurriness because of the long exposure length. In some aspects, the means for capturing may include an image sensor.

Figure 3A:
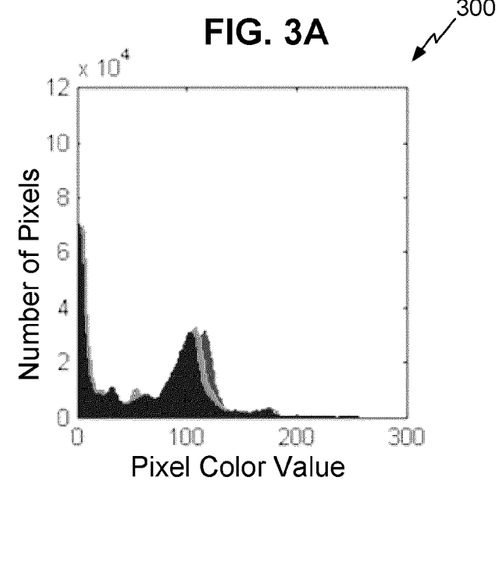
FIG. 3A illustrates an exemplary RGB histogram of an aligned first image.
Figure 3B:
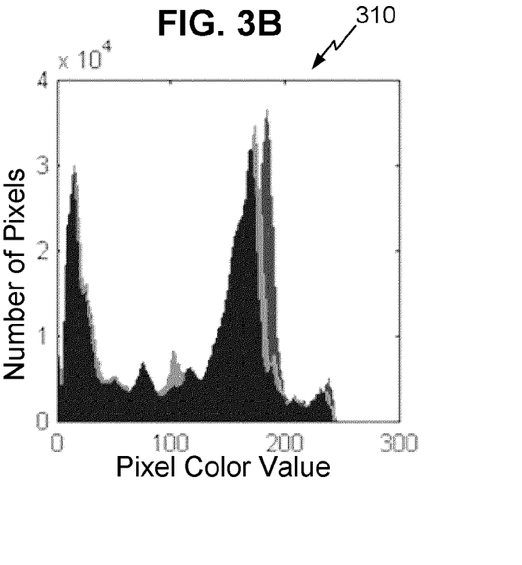
FIG. 3B illustrates an exemplary RGB histogram of a longer-exposure second image.

At block 250, the method includes using the second image to adjust the brightness of the combined first image. In some aspects, this image brightening could be done using an RGB (red-green-blue) histogram of the aligned first image and the RGB histogram of the long-exposure bright image. Based on this histogram, a mapping may be constructed which maps the RBG value in the longer-exposure second image to the RGB values in the combined first image. For example, FIG. 3A illustrates an exemplary RGB histogram 300 of an aligned first image. This histogram illustrates how common pixel values (for each of red, green, and blue are) for any given intensity. For example, pixel values of 0 are the most common, and there is a second peak at pixel values around 100. These pixel color values may be on a scale from 0 to 255, where 0 is black, and 255 is a full-strength pixel (either red, green or blue, and if all three are at 255, this is white). FIG. 3B illustrates an exemplary RGB histogram 310 of a longer-exposure second image. As shown in histogram 310, the peaks in the peaks in the histogram 310 are at relatively brighter levels than those in histogram 300, at around pixel values of 20 and 180. These higher pixel values generally correspond to a brighter image.

Figure 3C:
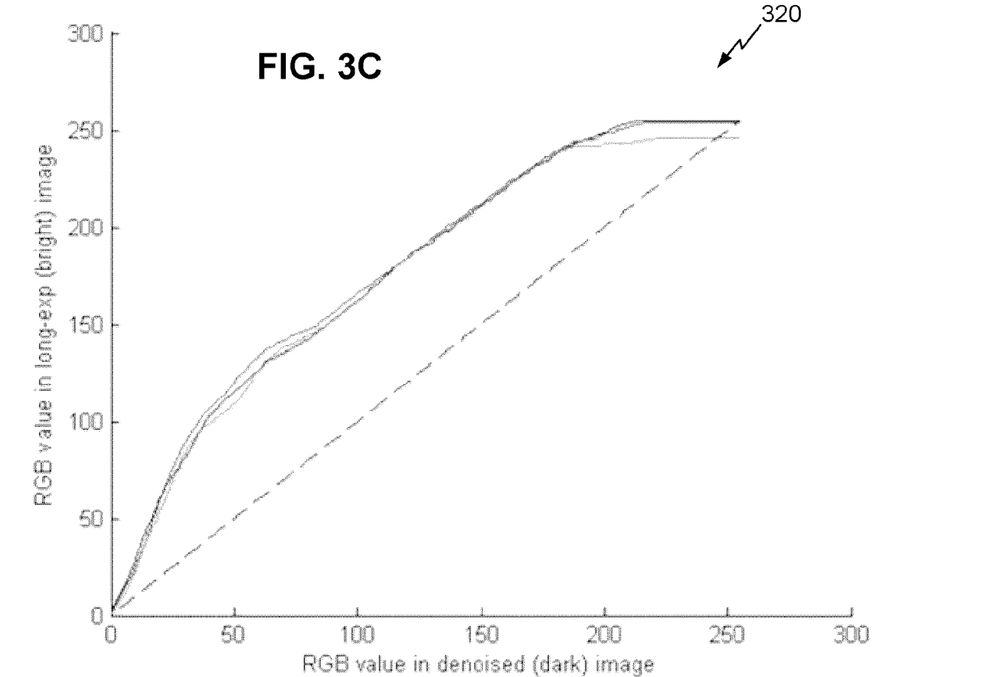
FIG. 3C illustrates an exemplary mapping tables, illustrating the RBG values in the longer-exposure image as compared to the RGB values in the aligned shorter-exposure images.

Based on the frequency of certain levels of red, green, and blue in the darker image and corresponding histogram 300 compared to the brighter image and corresponding histogram 310, a mapping may be constructed, which maps the colors of the darker image to more closely match those of the brighter image. FIG. 3C illustrates an exemplary mapping table 320, illustrating the RBG values in the longer-exposure image as compared to the RGB values in the aligned shorter-exposure images. Accordingly, this mapping may be used to increase the brightness of the darker image to match the brightness of the brighter image. Other techniques may also be used. For example, this brightness adjustment may also be used in a YUV color space, to adjust the luminance of the darker image and/or adjust the colors in the U and V channels of the darker image. In some aspects, the means for using the second image may include a processor.

Figure 4:
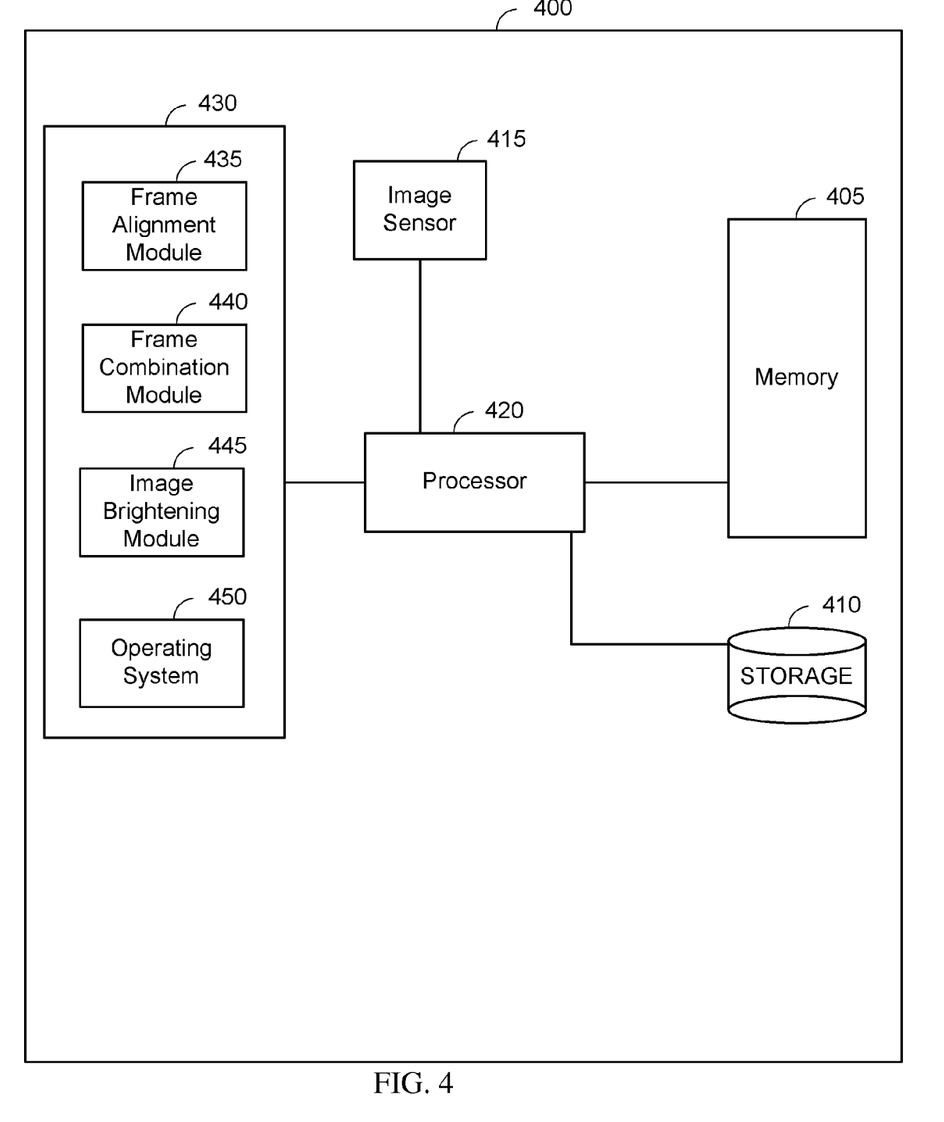
FIG. 4 depicts a high-level block diagram of a device having a set of components including a processor operatively coupled to an image sensor.

FIG. 4 depicts a high-level block diagram of a device 400 having a set of components including a processor 420 operatively coupled to an image sensor 415. A working memory 405, storage 410, and memory 430 are also in communication with and operative attached to the processor. Device 400 may be a device configured to take digital photograhs and/or videos, such as a digital camera, a cell phone, or another device.

The image sensor 415 may be configured to capture a number of pixels of an image. Any number of such pixels may be included on the device 400. The pixels on an image sensor may be arranged in a number of rows and columns, in order to form a grid. The image sensor 415 can be, for example, a charge-coupled device (CCD), a complementary metal-oxide semiconductor (CMOS) sensor, or the like. The image sensor 415 may be coupled to the processor (or "image processor") 420 to transmit a captured image to the processor 420. The processor 420 may be configured to perform various operations on a received captured image in order to create an output image.

Processor 420 may be a general purpose processing unit or a processor specially designed for the disclosed methods. As shown, the processor 420 is connected to a memory 430 and a working memory 405. In the illustrated embodiment, the memory 430 stores frame alignment module 435, frame combination module 440, image brightening module 445 and operating system 450. These modules include instructions that configure the processor to perform various tasks. Working memory 405 may be used by processor 420 to store a working set of processor instructions contained in the modules of memory 430. Alternatively, working memory 405 may also be used by processor 420 to store dynamic data created during the operation of device 400.

As mentioned above, the processor 420 is configured by several modules stored in the memories. For example, the frame alignment module 435 may include instructions that configure the processor 420 to align two or more frames with each other, where those two or more frames were captured with the image sensor 415. For example, the frame alignment module 435 may contain instructions which enables to processor 420 to recognize certain portions on each of a number of captured images, and thus to align the captured images with each other using at least one or more recognized portions of those images with correspond to the same portions of other captured images. For example, this alignment may include using an affine fit.

The memory 430 may also contain a frame combination module 440. The frame combination module 440 may contain instructions that configure the processor 420 to combine a plurality of images with each other. For example, as discussed above, images may be converted to YUV format, and the Y (luma) channel of the images may be combined using a denoising and optimization process. The frame combination module 440 may further contain instructions which configure processor 420 to combine the U and V (chroma) channels of the images based on, for example, a simple averaging of the pixel values in those channels.

The memory 430 may also contain an image brightening module 445. The image brightening module 445 may be configured to receive a dark image from the processor 420 and to receive a brighter, but potentially blurry image from the processor 420. The image brightening module 445 may contain instructions sufficient to allow the processor 420 to brighten the dark image based on the bright image. For example, the processor 420 may create RGB histograms of both the dark and the bright images, and may creating a mapping from the colors of the dark image to those of the bright image. By applying this mapping to the dark image, the colors of the dark image may be brightened, while retaining the relative sharpness of the dark image as compared to the blurry bright image. The image brightening module 445 may also use other methods to brighten the dark image, in addition to or instead of the above method.

Operating system module 450 configures the processor to manage the memory and processing resources of device 400. For example, operating system module 450 may include device drivers to manage hardware resources such as the image sensor 415 or storage 410. Therefore, in some embodiments, instructions contained in modules discussed above may not interact with these hardware resources directly, but instead interact through standard subroutines or APIs located in operating system component 450. Instructions within operating system 450 may then interact directly with these hardware components.

Processor 420 may write data to storage module 410. While storage module 410 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 4 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 4 shows two memory components, to include memory component 430 having several modules, and a separate memory 405 having a working memory, one with skill in the art would recognize several embodiments utilizing different memory architectures. For example, a design may utilize ROM or static RAM memory for the storage of processor instructions implementing the modules contained in memory 430. Alternatively, processor instructions may be read at system startup from a disk storage device that is integrated into device 400 or connected via an external device port. The processor instructions may then be loaded into RAM to facilitate execution by the processor. For example, working memory 405 may be a RAM memory, with instructions loaded into working memory 405 before execution by the processor 420.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIG. 1 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of capturing an image, the method comprising:
   capturing a plurality of first frames with a first exposure length using an image sensor and storing the plurality of first frames on a memory component;
   processing the captured plurality of first frames to align each of the plurality of first frames with each other;
   combining the aligned plurality of first frames into a combined first image;
   capturing a second image with the second exposure length using an image sensor and storing the second image on the memory component, wherein the second exposure length is longer than the first exposure length; and
   using the second image to adjust the brightness of the combined first image.

2. The method of claim 1, wherein using the second image comprises:
   determining a histogram of the colors in the combined first image and a histogram of the colors in the second image; and
   calculating a mapping of the colors from the combined first image to the colors of the second image based at least in part on the histogram of the colors in the combined first image and the histogram of the colors in the second image.

3. The method of claim 1, wherein processing the captured plurality of first frames comprises using an affine fit process.

4. The method of claim 3, wherein the affine fit process is a six-parameter affine fit.

5. The method of claim 1, wherein combining the aligned plurality of first frames comprises using pixel averaging to combine the aligned plurality of first frames.

6. The method of claim 1, wherein combining the aligned plurality of first frames into a combined first image comprises:
   converting the aligned plurality of first frames into YUV format; and
   combining the aligned plurality of first frames in each of a Y channel, a U channel, and a V channel.

7. The method of claim 6, wherein combining the aligned plurality of first frames in the Y channel comprises using a denoising process and an optimization process to combine the frames in the Y channel.

8. The method of claim 7, wherein the denoising process is based on a L1-norm Total Variation model.

9. The method of claim 7, wherein the optimization process comprises using of a Split-Bregman algorithm, a limited-memory Broyden-Fletcher-Goldfarb-Shanno algorithm, or an iteratively reweighted least squares algorithm.

10. A device for capturing an image, the device comprising:
   an image sensor configured to capture a plurality of first frames with a first exposure length and store the plurality of first frames on a memory component;
   a processor configured to:
      process the captured plurality of first frames to align each of the plurality of first frames with each other;
      combine the aligned plurality of first frames into a combined first image;
      capture a second image with a second exposure length using the image sensor and storing the second image on the memory component, wherein the second exposure length is longer than the first exposure length; and
      use the second image to adjust the brightness of the combined first image.

11. The device of claim 10, wherein the processor is configured to use the second image, comprising:
   determining a histogram of the colors in the combined first image and a histogram of the colors in the second image; and
   calculating a mapping of the colors from the combined first image to the colors of the second image based at least in part on the histogram of the colors in the combined first image and the histogram of the colors in the second image.

12. The device of claim 10, wherein processing the captured plurality of first frames comprises using an affine fit process.

13. The device of claim 12, wherein the affine fit process is a six-parameter affine fit.

14. The device of claim 10, wherein combining the aligned plurality of first frames comprises using pixel averaging to combine the aligned plurality of first frames.

15. The device of claim 10, wherein combining the aligned plurality of first frames into a combined first image comprises:
   converting the aligned plurality of first frames into YUV format; and
   combining the aligned plurality of first frames in each of a Y channel, a U channel, and a V channel.

16. The device of claim 15, wherein combining the aligned plurality of first frames in the Y channel comprises using a denoising process and an optimization process to combine the frames in the Y channel.

17. The device of claim 16, wherein the denoising process is based on a L1-norm Total Variation model.

18. The device of claim 16, wherein the optimization process comprises using of a Split-Bregman algorithm, a limited-memory Broyden-Fletcher-Goldfarb-Shanno algorithm, or an iteratively reweighted least squares algorithm.

19. A device for capturing an image, the device comprising:
   means for capturing a plurality of first frames with a first exposure length using an image sensor and storing the plurality of first frames on a memory component;
   means for processing the captured plurality of first frames to align each of the plurality of first frames with each other;
   means for combining the aligned plurality of first frames into a combined first image;
   means for capturing a second image with the second exposure length using an image sensor and storing the second image on the memory component, wherein the second exposure length is longer than the first exposure length; and
   means for using the second image to adjust the brightness of the combined first image.

20. The device of claim 19, wherein means for using the second image comprise:
   means for determining a histogram of the colors in the combined first image and a histogram of the colors in the second image; and
   means for calculating a mapping of the colors from the combined first image to the colors of the second image based at least in part on the histogram of the colors in the combined first image and the histogram of the colors in the second image.

* * * * *